(12) United States Patent
Manarolla

(10) Patent No.: US 10,029,400 B2
(45) Date of Patent: Jul. 24, 2018

(54) STONE AND EPOXY TILES AND A METHOD TO MANUFACTURE

(71) Applicant: Dante Manarolla, Canton, MI (US)

(72) Inventor: Dante Manarolla, Canton, MI (US)

( * ) Notice: Subject to any disclaimer, the term of this patent is extended or adjusted under 35 U.S.C. 154(b) by 84 days.

(21) Appl. No.: 15/239,124

(22) Filed: Aug. 17, 2016

(65) Prior Publication Data
US 2018/0050472 A1    Feb. 22, 2018

(51) Int. Cl.
| | | |
|---|---|---|
| *B32B 27/38* | (2006.01) | |
| *B29C 39/10* | (2006.01) | |
| *B29C 39/02* | (2006.01) | |
| *B29C 37/00* | (2006.01) | |
| *B29B 13/06* | (2006.01) | |
| *E04F 15/08* | (2006.01) | |
| *B29K 63/00* | (2006.01) | |
| *B29K 105/16* | (2006.01) | |
| *B29K 105/20* | (2006.01) | |
| *B29K 509/00* | (2006.01) | |
| *B29L 31/10* | (2006.01) | |

(52) U.S. Cl.
CPC .............. *B29C 39/10* (2013.01); *B29B 13/06* (2013.01); *B29C 37/0025* (2013.01); *B29C 39/025* (2013.01); *E04F 15/082* (2013.01); *B29K 2063/00* (2013.01); *B29K 2105/16* (2013.01); *B29K 2105/20* (2013.01); *B29K 2509/00* (2013.01); *B29K 2709/14* (2013.01); *B29L 2031/104* (2013.01)

(58) Field of Classification Search
CPC ..... B29C 39/10; B29C 37/0025; B29B 13/06; B29K 2063/00; B29K 2105/16; B29K 2105/20; B29K 2509/00; B29K 2709/14; B29L 2031/104
USPC ......................................................... 428/413
See application file for complete search history.

(56) References Cited

U.S. PATENT DOCUMENTS

| | | | |
|---|---|---|---|
| 7,393,583 B1 * | 7/2008 | Warren ..................... | B32B 5/22 428/327 |
| 2004/0170806 A1 * | 9/2004 | Hittle ........................ | B32B 5/22 428/141 |

* cited by examiner

*Primary Examiner* — David T Karst
(74) *Attorney, Agent, or Firm* — Diana D. Brehob; Brehob Law, PLLC

(57) ABSTRACT

A tile made of hard objects, such as stones, that are enclosed in epoxy and a method to fabricate such tiles are disclosed. The method includes placing a predetermined volume of sand of a predetermined coarseness into a mold of a predetermined size; leveling the sand in the mold; placing a first predetermined volume of stones of a first predetermined size range over the sand in the mold; placing a second predetermined volume of stones of a second predetermined size range over the sand in the mold; pouring a predetermined amount of self-leveling epoxy material over the stones and sand; and curing the epoxy material. A top coat is next applied to ensure that the bigger stones that sit proud of the epoxy are wetted to give the brilliant color of wet stones as seen at the lakeshore.

19 Claims, 2 Drawing Sheets

STONE AND EPOXY TILES AND A METHOD TO MANUFACTURE

FIELD OF INVENTION

The present disclosure relates to surface coverings, in particular those including natural stones.

BACKGROUND

It is known in the art to cover floors with stones encased in a hard, clear, plastic material. The stones are visible through the plastic material. However, they don't give the look of stones at the beach. They cover the natural beauty of the stones. Furthermore, the plastic provides a smooth surface that obscures the texture of the stones.

SUMMARY

To overcome shortcomings of prior art coverings, a method to make an improved stone tile is disclosed that includes: placing a mold onto a level surface, placing a predetermined volume of sand of a predetermined coarseness into the mold, placing a predetermined volume of hard objects of a predetermined size range over the sand, pouring a predetermined amount of self-leveling epoxy material over the hard objects and sand, and curing the epoxy material.

The hard objects are stones in some embodiments. The method may further include smoothing the sand to a level surface before placing the stones over the sand wherein the smoothing is done by one of shaking and troweling.

In some embodiments the hard objects of the predetermined size range of is a first predetermined size range of stones. The method may further include placing a predetermined volume of stones of a second predetermined size range over the sand after placing the predetermined volume of stones of the first predetermined size range. The second predetermined size range is smaller than the first predetermined size range.

The method may further include: washing the hard objects in an acidic bath and drying the hard objects after washing the hard objects and prior to placing the hard objects over the sand.

Curing may be performed in an oven at a predetermined temperature.

The method may further include: applying a top coat over the hard objects, curing the top coat, and removing the tile from the mold.

In some embodiments, the top coat is a polysiloxane material.

In some embodiments, the epoxy material is water based.

In some embodiments, the hard objects are lakeshore stones.

Also disclosed is a tile that has a sand base, a first predetermined volume of stones of a first size range placed over the sand base, a second predetermined volume of stones of a second size range placed over the sand base, and a cured epoxy material binding the first and second layers of stone and sand base.

The first size range is greater than the second size range; and the first volume of stones are placed over the sand base before the second volume of stones are placed over the sand base.

The stones are prepared in an acid wash prior to placing them over the sand base.

In some embodiments, the tile has a top coat over the stones, which can be a polysiloxane material.

A method for manufacturing a tile is disclosed that includes: placing a predetermined volume of sand of a predetermined coarseness into a mold of a predetermined size, leveling the sand in the mold, placing a first predetermined volume of stones of a first predetermined size range over the sand in the mold, placing a second predetermined volume of stones of a second predetermined size range over the sand in the mold, and pouring a predetermined amount of self-leveling epoxy material over the stones and sand.

The mold is made of a polystyrene material.

The method further includes curing the epoxy material and applying a top coat over the stones after the epoxy has cured. The top coat material is one that provides a glossy finish.

The method may further include selecting the first and second predetermined volume of stones based on color of the stones.

The method further includes: processing the stones in an acidic bath and drying the stones.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
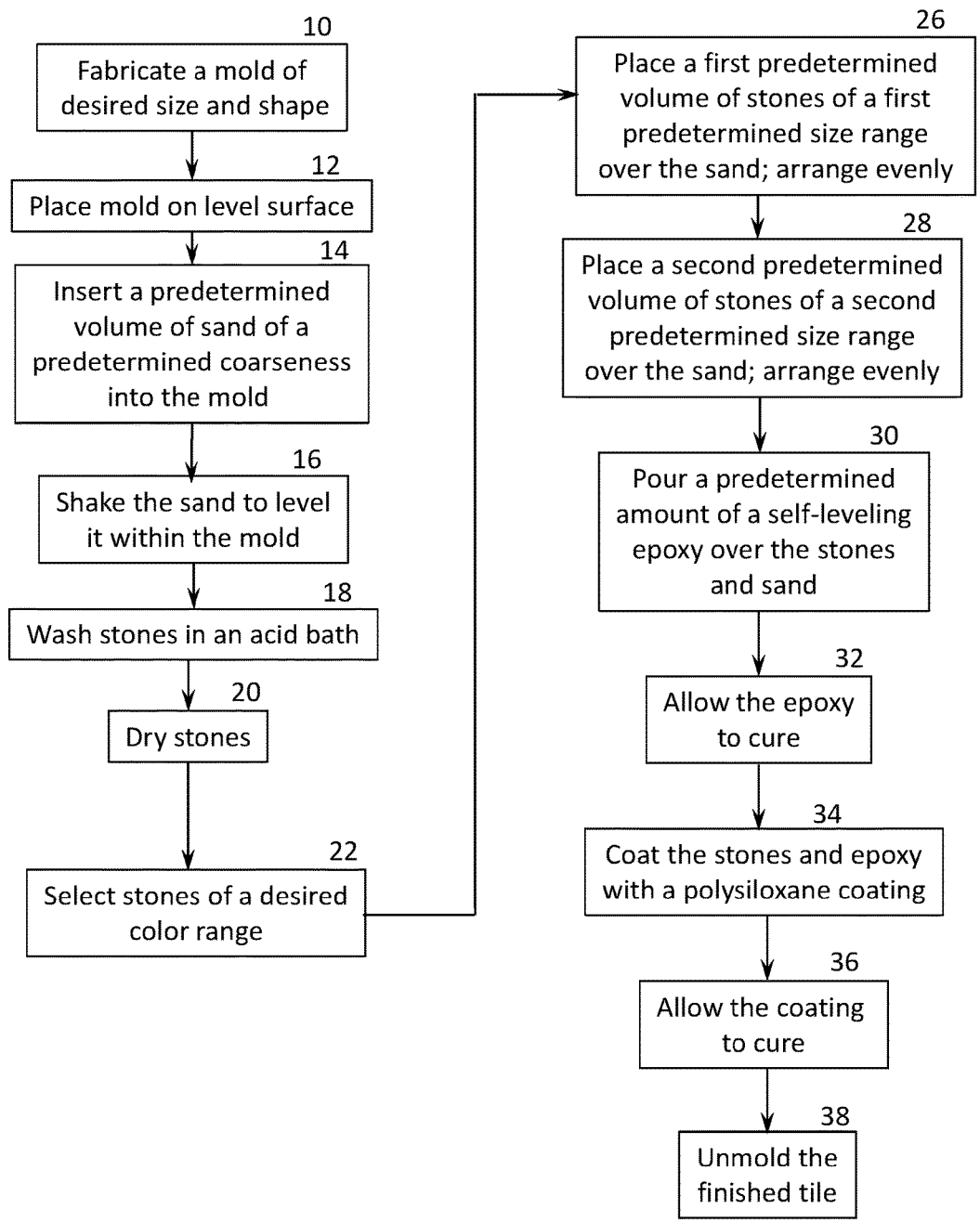
FIG. 1 shows a process by which the tiles are fabricated according to an embodiment of the disclosure.

Referring to FIG. 1, a process by which a tile according to the present disclosure is shown. Starting in block 10, a mold is fabricated out of polystyrene or other suitable material. The mold is essentially a flat pan with the inside dimensions of the pan of the desired finished tile. The mold is placed on a level surface in block 12. In block 14, a predetermined volume of sand is placed in the mold. The amount of sand is determined based on the desired thickness of the tile and the cross-sectional area of the desired tile. The sand is also of a predetermined coarseness. If too fine, the epoxy applied in a later step has difficulty filling the gaps between the grains of sand. In block 16, the sand is leveled by shaking, troweling or other suitable method. Stones that are to be used are washed in an acid bath, such as a 20% solution of hydrochloric acid in block 18. Any algae, bacteria or other foreign matter is removed in such a step. As will be discussed below, there can be multiple grades of stones, i.e., size ranges. The different size stones can be cleaned together in the acid wash and then separated afterward. Or the cleaning can be performed on the graded stones in separate batches. The cleaning process can be performed at any time before the stones are placed in the mold in a later process. In block 20, the stones are allowed to dry. In some embodiments, a particular color of rock is preferred. For example, one might select black, gray and white stones to provide a desired look. In block 22, an optional process, stones are selected in the desired color range or desired colors. In block 26, a first predetermined volume of a first predetermined size range of stones is placed over the sand. Alternatively, it is a first predetermined mass of stones. In block 28, a second predetermined volume of a second predetermined size range of stones is placed over the sand. The first predetermined size range is greater than the second predetermined size range. In an alternative embodiment, only one size range of stones is used. In yet another embodiment, three or more size ranges are used. Additionally, hard objects other than stones can be used in the process. The stones are arranged in a layer substantially evenly over the sand. In block 30, a predetermined self-leveling epoxy is poured over the stones and sand in the mold. In some embodiments, the epoxy is a water-based. In block 32, the epoxy is allowed to cure. The epoxy, stones, and sand congeal into a unitary piece. The top of the stones, is not uniformly covered at this point. In block 34, the top surface is covered with a coating, which in one embodiment is a polysiloxane material. The coating is allowed to occur in block 36 before unmolding the tile in block 38.

Figure 2:
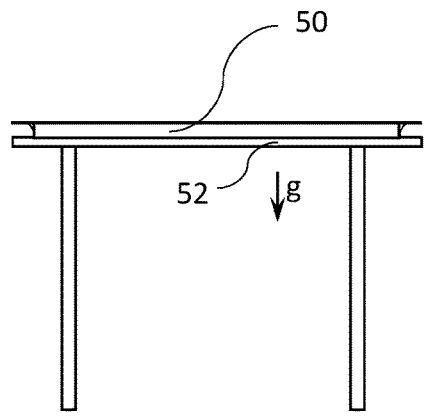
FIG. 2 is a view of a mold on a table.

In FIG. 2, a mold 50 is shown on a flat surface of a table 52. The top surface of table 52 is perpendicular to gravity (g, in FIG. 2). A level or other device can be used to ensure the table top is level so that the finished tile is of substantially uniform thickness.

Figure 3:
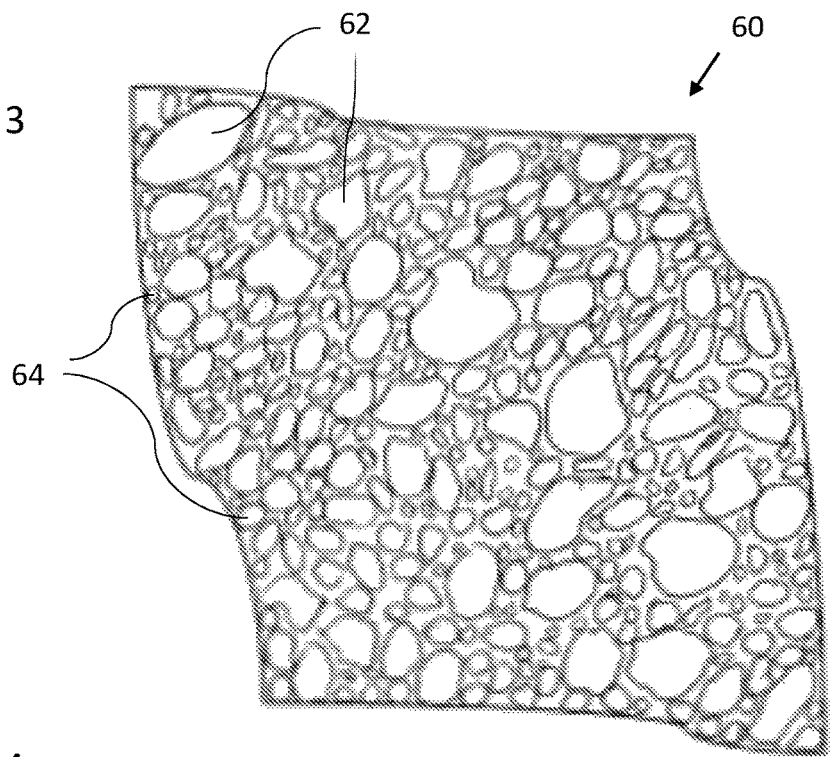
FIG. 3 is a plan view of a tile from a top surface.
Figure 4:
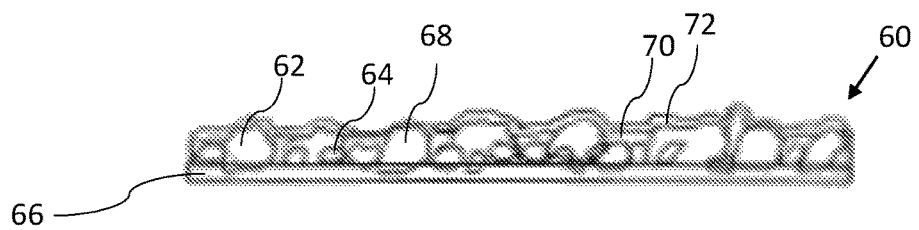
FIG. 4 is a side view of the tile of FIG. 3.

In FIG. 3, a typical upper surface of a portion of a tile 60 fabricated by the process disclosed is shown. Stones 62 are of a first predetermined size range and stones 64 are of a second predetermined size range. Between stones 62 and 64 the epoxy congealed and top coated sand is seen. A side view of tile 60 is shown in FIG. 4, showing an epoxy layer congealed with sand 66 with some parts of stones extending down in the sand layer. Stones 62 and 64 are of the first and second size ranges, respectively. The epoxy layer 70 extends over some of the stones. However, some of the larger stones, stone 68 as an example extend above the layer of the self-leveling epoxy. It is a feature, according to this invention, that the natural undulations remain and some of the stones sit proud compared to other stones. To retain the wet look of the stones, i.e., the one that brings out the beautiful natural colors as they appear at the lakeshore, a top coat 72, that is not self-leveling is applied. In FIG. 3, there is a line between epoxy layer 66 and 70. However, in reality there is no such interface. The interface is shown simply to delineate a lower region in which the epoxy is within the sand, primarily, and an upper region in which the epoxy is within mainly stones of the two sizes.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, efficiency, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. A method for manufacturing a tile, comprising:
    placing a mold onto a level surface;
    placing a predetermined volume of sand of a predetermined coarseness into the mold;
    placing a predetermined volume of stones of a first predetermined size range over the sand;
    placing a predetermined volume of hard objects of a second predetermined size range over the sand after placing the predetermined volume of stones of the first predetermined size range
    pouring a predetermined amount of self-leveling epoxy material over the hard objects and sand; and
    curing the epoxy material wherein the second predetermined size range is smaller than the first predetermined size range.

2. The method of claim 1 wherein the method further comprising: smoothing the sand to a level surface before placing the stones over the sand wherein the smoothing is done by one of shaking and troweling.

3. The method of claim 1 further comprising:
    washing the stones in an acidic bath; and
    drying the stones after washing the stones and prior to placing the stones over the sand.

4. The method of claim 1 wherein the curing is performed in an oven at a predetermined temperature.

5. The method of claim 1, further comprising:
    applying a top coat over the stones;
    curing the top coat; and
    removing the tile from the mold.

6. The method of claim 5 wherein the top coat is a polysiloxane material.

7. The method of claim 1 wherein the epoxy material is water based.

8. The method of claim 1 wherein the stones are lakeshore stones.

9. A method for manufacturing a tile, comprising:
    placing a predetermined volume of sand of a predetermined coarseness into a mold of a predetermined size;
    leveling the sand in the mold;
    placing a first predetermined volume of stones of a first predetermined size range over the sand in the mold;
    placing a second predetermined volume of stones of a second predetermined size range over the sand in the mold; and
    pouring a predetermined amount of self-leveling epoxy material over the stones and sand.

10. The method of claim 9 wherein the mold is made of a polystyrene material.

11. The method of claim 9, further comprising:
    curing the epoxy; and
    applying a top coat over the stones after the epoxy has cured.

12. The method of claim 11 wherein the top coat material comprises a material that provides a glossy finish.

13. The method of claim 9 wherein the first predetermined volume of stones differ in color from the second predetermined volume of stones.

14. The method of claim 9, further comprising;
    processing the stones in an acidic bath; and
    drying the stones.

15. A method for manufacturing a tile, comprising:
    placing a predetermined volume of sand of a predetermined coarseness into a mold;

washing hard objects of a predetermined size range in an acidic bath;

placing a predetermined volume of the hard objects over the sand; and pouring a predetermined amount of self-leveling epoxy material over the hard objects and sand.

16. The method of claim 15, further comprising:

placing the mold onto a level surface;

drying the hard objects prior to pouring the self-leveling epoxy; and unmolding the sand, hard objects and epoxy after the epoxy has cured.

17. The method of claim 15 wherein the predetermined volume of hard objects is a first predetermined volume of hard objects of a first predetermined size range, the method further comprising:

placing a second predetermined volume of hard objects of a second predetermined size range in the mold wherein the first predetermined size range is less than the second predetermined size range.

18. The method of claim 15 further comprising:

shaking the sand in the mold to level the sand; and placing the mold on a level surface.

19. The method of claim 15, further comprising:

curing the epoxy; and applying a top coat over the stones after the epoxy has cured.

\* \* \* \* \*